US008667543B2

United States Patent
Hui et al.

(10) Patent No.: US 8,667,543 B2
(45) Date of Patent: Mar. 4, 2014

(54) METHOD AND SYSTEM FOR IMPROVING PLAYING QUALITY OF MOBILE TV

(75) Inventors: Yi Hui, Shenzhen (CN); Jiejie Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,342

(22) PCT Filed: Dec. 7, 2009

(86) PCT No.: PCT/CN2009/075347
§ 371 (c)(1),
(2), (4) Date: Dec. 12, 2011

(87) PCT Pub. No.: WO2010/145126
PCT Pub. Date: Dec. 23, 2010

(65) Prior Publication Data
US 2012/0110624 A1    May 3, 2012

(30) Foreign Application Priority Data
Jun. 16, 2009 (CN) .......................... 2009 1 0203785

(51) Int. Cl.
*H04N 7/16* (2011.01)
(52) U.S. Cl.
USPC ................................. 725/62; 725/87; 455/329
(58) Field of Classification Search
USPC .............. 725/62, 86–118; 455/329, 333, 337, 455/343, 341, 344, 468; 709/217–232
See application file for complete search history.

(56) References Cited

U.S. PATENT DOCUMENTS

| | | | | |
|---|---|---|---|---|
| 6,487,603 | B1 * | 11/2002 | Schuster et al. | 709/231 |
| 7,788,545 | B2 * | 8/2010 | Yanagi | 714/47.1 |
| 7,974,631 | B2 * | 7/2011 | Cho | 455/453 |
| 8,171,152 | B2 * | 5/2012 | White et al. | 709/231 |
| 8,423,014 | B2 * | 4/2013 | McGregor et al. | 455/425 |
| 2005/0120377 | A1 | 6/2005 | Carlucci et al. | |

(Continued)

FOREIGN PATENT DOCUMENTS

| CN | 1342011 A | 3/2002 |
|---|---|---|
| CN | 1747366 A | 3/2006 |

(Continued)

OTHER PUBLICATIONS

International Search Report in international application No. PCT/CN2009/075347, mailed Mar. 25, 2010.

(Continued)

*Primary Examiner* — Annan Shang
(74) *Attorney, Agent, or Firm* — Oppedahl Patent Law Firm LLC

(57) ABSTRACT

The present invention provides a method and system for improving playing quality of a mobile TV to address the technical problem that the playing quality of a mobile TV is influenced by network coverage discrepancies of a mobile TV. In the present invention, a terminal detects the network signal intensity of a mobile TV, performs a match determination between the network signal intensity and the data rate of the mobile TV, and requests a mobile TV service platform to dynamically adjust the program data rate of the mobile TV according to the result of the match determination. In this way, the present invention improves the playing quality of the programs of the mobile TV, and enables the user to enjoy programs of the mobile TV satisfactorily in different mobile TV network environments.

12 Claims, 2 Drawing Sheets

(56) References Cited

U.S. PATENT DOCUMENTS

| | | | |
|---|---|---|---|
| 2005/0122429 A1* | 6/2005 | Katsube et al. | 348/555 |
| 2006/0127032 A1 | 6/2006 | Van Rooyen | |
| 2007/0218916 A1 | 9/2007 | Cho | |
| 2008/0039082 A1* | 2/2008 | Kim | 455/434 |

FOREIGN PATENT DOCUMENTS

| | | |
|---|---|---|
| CN | 1747581 A | 3/2006 |
| CN | 101097538 A | 1/2008 |
| CN | 101198047 A | 6/2008 |
| CN | 101207783 A | 6/2008 |
| CN | 101355391 A | 1/2009 |
| JP | 2005175556 A | 6/2005 |
| WO | 2006001600 A1 | 1/2006 |

OTHER PUBLICATIONS

English Translation of the Written Opinion of the International Search Authority in international application No. PCT/CN2009/075347, mailed on Mar. 25, 2010.

* cited by examiner

METHOD AND SYSTEM FOR IMPROVING PLAYING QUALITY OF MOBILE TV

TECHNICAL FIELD

The present invention relates to the field of mobile multimedia broadcasting, and in particular to a method and system for improving playing quality of a mobile TV.

BACKGROUND

Digital mobile multimedia broadcasting techniques and standards have developed fast in recent years, such as European Digital Video Broadcast Handheld (DVB-H), America Media Forward Link Only (Media FLO) and China Mobile Multimedia Broadcasting (CMMB). The various standards provide a mobile terminal user of the mobile multimedia broadcasting with various services such as advertisement, weather forecast, news, sports show, entertainment show, multimedia broadcasting play, movies and the like. The user can select an interested program that is provided by the mobile multimedia broadcasting.

The mobile TV service based on CMMB has been developing fast, which enables a mobile telephone user to watch television programs on a mobile telephone. Operators are putting more and more investment in the operation of the CMMB-based mobile TV service, and mobile TV service has become a hot spot and focus concerned by both operators and content providers in 3G times.

The playing quality of a mobile TV directly decides the mobile TV service experience of a user and has a vital influence on the benefits of the operators and content providers who provide mobile TV services.

At present, the construction progress of mobile TV networks varies significantly in different regions, and the coverage of a mobile TV network is not uniform even within a same region. As the coverage of a CMMB mobile TV network has a great influence on the playing quality of a mobile TV, it becomes a problem that must be taken into consideration and addressed how to provide the user a better program watching experience in such a complicated CMMB mobile TV network environment.

SUMMARY

The present invention provides a method and system for improving playing quality of a mobile TV to address the technical problem that the playing quality of a mobile TV is influenced by network coverage discrepancies of a mobile TV.

In order to address the above problem, the present invention provides a method for improving playing quality of a mobile TV, which comprises:

when a mobile TV program is played on the mobile terminal, detecting a data rate of the played program and a network signal intensity of a mobile TV network by the mobile terminal, determining whether or not the data rate of the played program matches the detected network signal intensity, and when the data rate of the played program does not match the detected network signal intensity, requesting the mobile TV service platform to transmit mobile TV program data whose data rate matches the network signal intensity;

sending by the mobile TV service platform, according to the request of the mobile terminal, the mobile TV program data with an adjusted data rate to the mobile terminal.

Further, if determining the data rate of the played program does not match the detected network signal intensity, and the data rate of the played program is higher than the data rate matching the network signal intensity, the mobile terminal may request the mobile TV service platform to reduce the data rate of the transmitted mobile TV program data;

the mobile TV service platform may send, according to the request of the mobile terminal, the mobile TV program data with reduced data rate to the mobile terminal.

Further, if determining the data rate of the played program does not match the detected network signal intensity, and the data rate of the played program is lower than the data rate matching the network signal intensity, the mobile terminal may request the mobile TV service platform to increase the data rate of the transmitted mobile TV program data;

the mobile TV service platform may send, according to the request of the mobile terminal, the mobile TV program data with increased data rate to the mobile terminal.

Further, before the mobile TV service platform sends the mobile TV program data with the adjusted data rate to the mobile terminal, the method may further comprise:

informing the mobile terminal of the adjusted data rate by the mobile TV service platform;

determining by the mobile terminal whether or not a resource supports the adjusted data rate, and returning a data rate adjustment confirmation message to the mobile TV service platform if the resource supports the adjusted data rate;

after the data rate adjustment confirmation message is received by the mobile TV service platform, sending the mobile terminal the mobile TV program data with the adjusted data rate by the mobile TV service platform.

Further, when sending the data rate adjustment confirmation message, the mobile terminal may adjust resource occupied by the played mobile TV program according to the adjusted data rate: increasing the resource occupied by the played mobile TV program if the data rate is increased, or maintaining the resource occupied by the played mobile TV program if the data rate is reduced.

The present invention further provides a system for improving playing quality of a mobile TV, which comprises: a mobile terminal and a mobile TV service platform, wherein the mobile terminal comprises a program playing module, a network signal intensity detection module and a program data rate adjustment module, wherein the program playing module is used for receiving and playing mobile TV program data, detecting a data rate of the played program when playing the mobile TV program, and sending the detected data rate of the played program to the network signal intensity detection module;

the network signal intensity detection module is used for detecting network signal intensity of a mobile TV network, determining a match degree between the received data rate of the played program and the detected network signal intensity, and sending the match degree to the program data rate adjustment module;

the program data rate adjustment module is used for determining whether or not data rate adjustment is needed according to the match degree after receiving the match degree, and requesting the mobile TV service platform to transmit mobile TV program data whose data rate matches the network signal intensity if the data rate adjustment is needed;

the mobile TV service platform is used for sending, according to the request of the program data rate adjustment module, the mobile TV program data with an adjusted data rate to the program playing module.

Further, if the program data rate adjustment module determines the data rate adjustment is needed, and the data rate of the played program is higher than the data rate matching the network signal intensity, the program data rate adjustment module may request the mobile TV service platform to reduce the data rate of the transmitted mobile TV program data;

the mobile TV service platform may send, according to the request of the program data rate adjustment module, the mobile TV program data with reduced data rate to the program playing module.

Further, if the program data rate adjustment module determines the data rate adjustment is needed, and the data rate of the played program is lower than the data rate matching the network signal intensity, the program data rate adjustment module may request the mobile TV service platform to increase the data rate of the transmitted mobile TV program data;

the mobile TV service platform may send, according to the request of the program data rate adjustment module, the mobile TV program data with increased data rate to the program playing module.

Further, the system may further comprise a program playing resource adjustment module;

the mobile TV service platform may further be used for informing the program playing resource adjustment module of the adjusted data rate before sending the mobile TV program data with the adjusted data rate to the program playing module, and sending the mobile TV program data with the adjusted data rate to the program playing module after receiving a data rate adjustment confirmation message;

the program playing resource adjustment module may be used for determining, after receiving the adjusted data rate, whether or not a resource supports the adjusted data rate, and returning the data rate adjustment confirmation message to the mobile TV service platform if the resource supports the adjusted data rate.

Further, when sending the data rate adjustment confirmation message, the program playing resource adjustment module may be further used for adjusting resource occupied by the played mobile TV program according to the adjusted data rate: increasing the resource occupied by the played mobile TV program if the data rate is increased, or maintaining the resource occupied by the played mobile TV program if the data rate is reduced.

In conclusion, by detecting the network signal intensity of a mobile TV and dynamically adjusting the program data rate of the mobile TV, the present invention improves the program playing quality of the mobile TV, enables the user to enjoy mobile TV programs satisfactorily in different mobile TV network environments, and provides the user with a better mobile TV program watching experience, thereby attracting the user to spend much time watching mobile TV programs to increase profits of mobile TV operators and content service providers.

DETAILED DESCRIPTION

In the present invention, network signal intensity of a mobile TV is detected by a mobile TV client on a mobile terminal, determination is made on whether or not the network signal intensity matches data rate according to the detected network signal intensity and the data rate of received mobile TV program data; if the network signal intensity is unmatched with the data rate, a mobile TV program data rate adjustment request is sent to a mobile TV network side, the network side informs the mobile terminal of an adjustment result and sends program data with adjusted data rate to the mobile terminal, and the mobile TV client adjusts resource that is used for playing the mobile TV program according to the result of the data rate adjustment. In the present invention, the network side is requested to send program data of a higher data rate in the case where the network signal intensity is high and the data rate of the program data is low, thereby improving the playing quality of the mobile TV; and the network side is requested to send program data of a lower data rate in the case where the network signal intensity is low and the data rate of the program data is high, thereby enabling the mobile terminal to play a mobile TV program normally.

The data rate, which refers to data traffic used by a video file in a unit time, is the most important factor in picture quality control of video coding. Under a same resolution, a video file with a higher data rate has a smaller compression ratio and a better picture quality.

Specific embodiments of the present invention are described below with reference to accompanying drawings.

Figure 1:
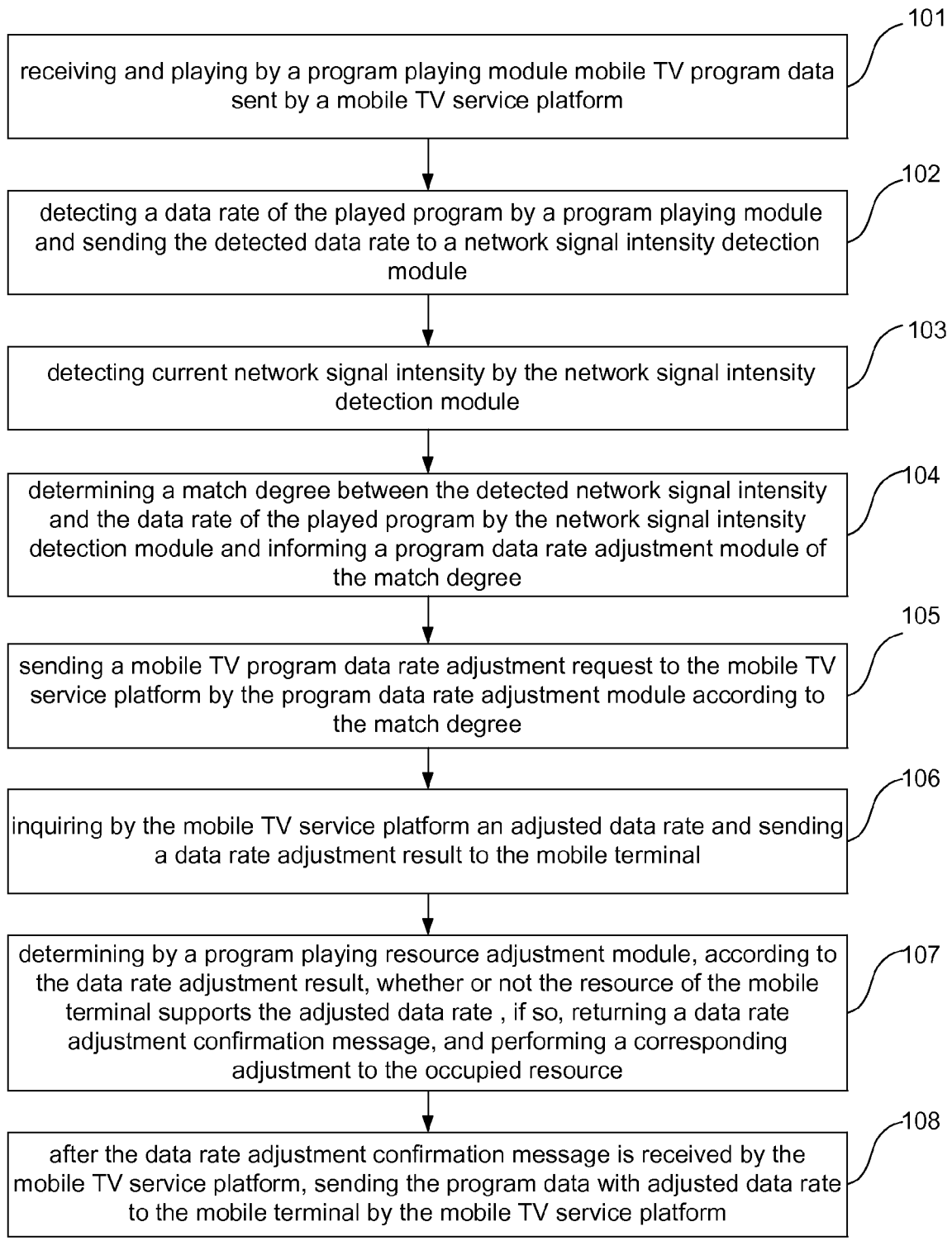
FIG. 1 is a diagram illustrating a flow of a method for improving playing quality of a mobile TV according to the present invention.

FIG. 1 shows a flow of a method for improving playing quality of a mobile TV according to the present invention, the method comprises the following steps.

Step 101: deploying a mobile TV client on a mobile terminal; after a user activates the mobile TV client, receiving and playing by a program playing module of the mobile TV client mobile TV program data sent by a mobile TV service platform.

Step 102: detecting a data rate of the played program by a program playing module and sending the detected data rate to a network signal intensity detection module.

Step 103: detecting current network signal intensity by the network signal intensity detection module.

Step 104: determining a match degree between the detected network signal intensity and the data rate of the played program by the network signal intensity detection module and informing a program data rate adjustment module of the match degree.

The match degree can be divided into the following three grades: Normal, Bad and Good, each of which is defined as follows.

Normal: the current network signal intensity matches the data rate of the played program, and no data rate adjustment is needed.

Bad: the current network signal intensity does not match the data rate of the played program and can hardly support playing of the mobile TV program at the current data rate, that is, the data rate of the played program is higher than a data rate matching the network signal intensity, and the data rate of the played program needs to be reduced;

Good: the current network signal intensity does not match the data rate of the played program and can support playing the mobile TV program at a higher data rate, that is, the data rate of the played program is lower than the data rate matching the network signal intensity, and the data rate of the played program needs to be increased.

For instance, according to actual use situation, the network signal intensity can be divided into seven grades: grade 0-grade 7, while the data rate is ranged from 128K to 700K. In a specific embodiment, the current network signal intensity may be set to n. When the grade of the current network signal intensity is 0-3, that is, $0<n\leq3$, the current network intensity matches a data rate ranged from 128K to 300K; when the grade of the current network signal intensity is 3-5, that is, $3<n\leq 5$, the current network signal intensity matches a data rate ranged from 300K to 500K; and when the grade of the current network signal intensity is 5-7, that is, $5<n\leq 7$, the current network signal intensity matches a data rate ranged from 500K to 700K. It can be determined that the match degree is Normal when the network signal intensity matches the data rate.

Accordingly, if the grade of the network signal intensity is 0-3 while the data rate is 300K-500K or 500K-700K, then it can be determined that the match degree is Bad. If the grade of the network signal intensity is 3-5 while the data rate is 128K-300K, then it can be determined that the match degree is Good. If the grade of the network signal intensity is 3-5 while the data rate is 500K-700K, then it can be determined that the match degree is Bad. If the grade of the network signal intensity is 5-7 while the data rate is 128K-300K or 300K-500K, then it can be determined that the match degree is Good.

Step 105: after the match degree sent by the network signal intensity detection module is received by the program data rate adjustment module, determining whether or not data rate adjustment is needed by the program data rate adjustment module according to the received match degree, and sending a mobile TV program data rate adjustment request to the mobile TV service platform to request adjustment to the data rate of the television program if data rate adjustment is needed.

After receiving a match degree 'Normal', the program data rate adjustment module determines that no data rate adjustment is needed and performs no processing.

After receiving a match degree 'Bad', the program data rate adjustment module sends a data rate reduction request message to the mobile TV service platform to request the mobile TV service platform to transmit program data of a lower data rate grade.

After receiving a match degree 'Good', the program data rate adjustment module sends a data rate increase request message to the mobile TV service platform to request the mobile TV service platform to transmit program data of a higher data rate grade.

Step 106: after the data rate adjustment request is received by the mobile TV service platform, inquiring by the mobile TV service platform an adjusted data rate as required by the mobile terminal and sending a data rate adjustment result to the mobile terminal to inform the mobile terminal of the adjusted data rate, wherein multi-grade data rate mobile TV program data is configured in the mobile TV service platform.

After receiving the data rate reduction request message, the mobile TV service platform inquires a data rate that is one grade lower than the current data rate of the program data and informs the mobile terminal of the result of the inquiry.

After receiving the data rate increase request message, the mobile TV service platform inquires a data rate that is one grade higher than the current data rate of the program data and informs the mobile terminal of the result of the inquiry.

Step 107: after the data rate adjustment result from the mobile TV service platform is received by the mobile terminal, determining by a program playing resource adjustment module of the mobile terminal, according to the data rate adjustment result, whether or not the resource of the mobile terminal supports the adjusted data rate, if so, returning a data rate adjustment confirmation message to the mobile TV service platform, and performing a corresponding adjustment to the resource occupied by the played mobile TV program according to the adjusted data rate, otherwise, discarding the result of the data rate adjustment and ending the flow.

When finding a reduction in the data rate, the program playing resource adjustment module maintains the resources such as memory and CPU occupied by the current mobile TV service unchanged to keep the stability of playing quality of the current mobile TV program.

When finding an increase in the data rate, the program playing resource adjustment module increases the resources such as memory and CPU occupied by the mobile TV service according to the adjusted data rate to match the resources occupied by the mobile TV service with the adjusted data rate to improve the playing quality of the television program and provide the user a better program watching experience.

Step 108: after the data rate adjustment confirmation message is received by the mobile TV service platform, sending the program data with adjusted data rate to the mobile terminal by the mobile TV service platform.

If receiving no data rate adjustment confirmation message, the mobile TV service platform continues to sending the program data of the current data rate.

Figure 2:
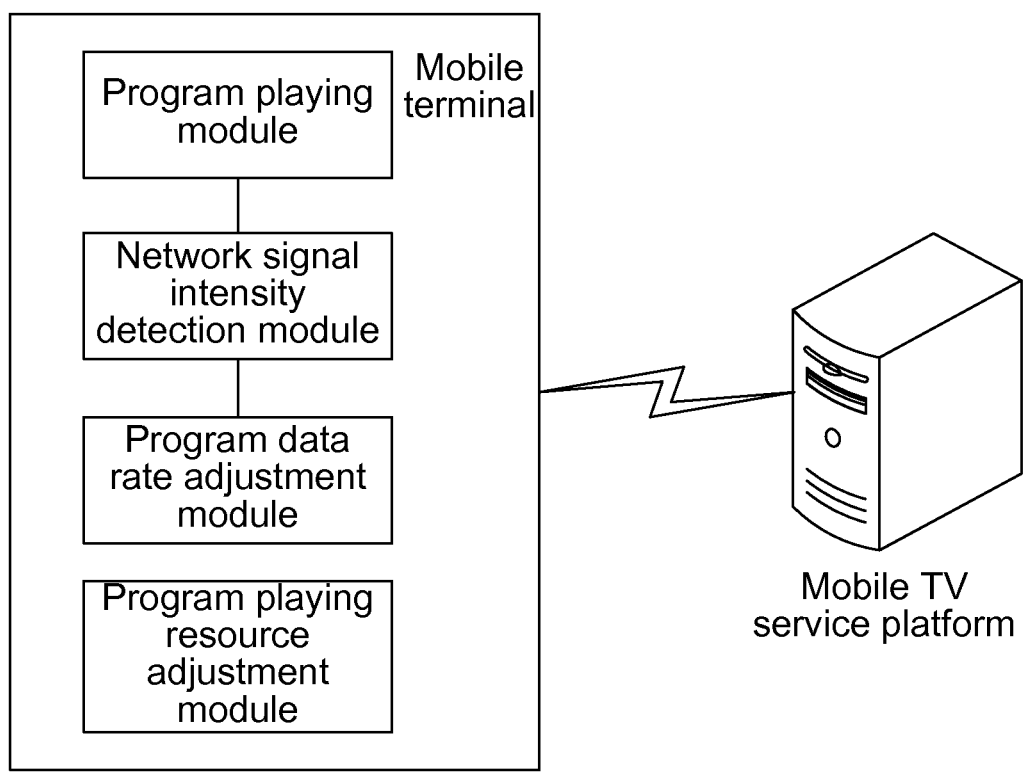
FIG. 2 is a diagram illustrating a structure of a system for improving playing quality of a mobile TV according to the present invention.

As shown in FIG. 2, a system for improving the playing quality of a mobile TV comprises: a mobile terminal and a mobile TV service platform, wherein the mobile terminal comprises a program playing module, a network signal intensity detection module, a program data rate adjustment module, and a program playing resource adjustment module.

The program playing module is used for receiving and playing mobile TV program data sent by the mobile TV service platform, detecting a data rate of the played program, and sending the detected data rate to the network signal intensity detection module.

the network signal intensity detection module is used for detecting current network signal intensity, determining a match degree between the detected network signal intensity and the data rate of the played program, and informing the program data rate adjustment module of the match degree.

The match degree can be divided into the following three grades: Normal, Bad and Good, each of which is defined as follows.

Normal: the current network signal intensity matches the data rate of the played program, and no data rate adjustment is needed.

Bad: the current network signal intensity does not match the data rate of the played program and can hardly support playing of the mobile TV program at the current data rate, that is, the data rate of the played program is higher than a data rate matching the network signal intensity, and the data rate of the played program needs to be reduced;

Good: the current network signal intensity does not match the data rate of the played program and can support playing the mobile TV program at a higher data rate, that is, the data rate of the played program is lower than the data rate matching the network signal intensity, and the data rate of the played program needs to be increased.

The program data rate adjustment module is used for determining whether or not data rate adjustment is needed according to the match degree received from the network signal intensity detection module, and sending a mobile TV program data rate adjustment request to the mobile TV service platform to request adjustment to the data rate of the television program if data rate adjustment is needed.

After receiving a match degree 'Normal', the program data rate adjustment module determines that no data rate adjustment is needed and performs no processing.

After receiving a match degree 'Bad', the program data rate adjustment module sends a data rate reduction request message to the mobile TV service platform to request the mobile TV service platform to transmit program data of a lower data rate grade.

After receiving a match degree 'Good', the program data rate adjustment module sends a data rate increase request message to the mobile TV service platform to request the mobile TV service platform to transmit program data of a higher data rate grade.

The program playing resource adjustment module is used for determining, according to the data rate adjustment result, whether or not the resource of the mobile terminal supports the adjusted data rate, if so, returning a data rate adjustment confirmation message to the mobile TV service platform, and then performing a corresponding adjustment to the resource occupied by the played mobile TV program according to the adjusted data rate, otherwise, discarding the result of the data rate adjustment and ending the flow.

When finding a reduction in the data rate according to the data rate adjustment result, the program playing resource adjustment module maintains the resources such as memory and CPU occupied by the current mobile TV service unchanged to keep the stability of the playing quality of the current mobile TV program.

When finding an increase in the data rate, the program playing resource adjustment module increases the resources such as memory and CPU occupied by the mobile TV service according to the adjusted data rate to match the resource occupied by the mobile TV service with the adjusted data rate to improve the playing quality of the television program and provide the user a better program watching experience.

The mobile TV service platform is used for inquiring the adjusted data rate as required by the mobile terminal after receiving the data rate adjustment request, sending a data rate adjustment result to the mobile terminal to inform the mobile terminal of the adjusted data rate, and sending the program data with adjusted data rate to the mobile terminal after receiving the data rate adjustment confirmation message.

With a capability of effectively improving the playing quality of a mobile TV and dynamically adjusting the data rate of a mobile TV program and the resource occupied by the played mobile TV program on the mobile terminal according to the result of detection of the current network signal intensity of the mobile TV, the present invention enables the user to enjoy a better mobile TV service experience in different network coverage environments and therefore effectively extending the time of using mobile TV service by the user and increasing the profits of mobile TV service operators.

The above mentioned are only preferred embodiments of the invention, rather than limitation to the invention. Various modification and variations can be made by those skilled in this art, and it should be understood that any modification, equivalent and improvement without departing from the scope of the present invention fall into the protection scope of the present invention.

The invention claimed is:

1. A method for improving playing quality of a mobile TV, applicable to a system comprising a mobile TV service platform and a mobile terminal, comprising:
   when a mobile TV program is played on the mobile terminal, detecting a data rate of the played program and a network signal intensity of a mobile TV network by the mobile terminal, determining whether or not the data rate of the played program matches the detected network signal intensity, and when the data rate of the played program does not match the detected network signal intensity, requesting the mobile TV service platform to transmit mobile TV program data whose data rate matches the network signal intensity;
   sending by the mobile TV service platform, according to the request of the mobile terminal, the mobile TV program data with an adjusted data rate to the mobile terminal.

2. The method according to claim 1, wherein
   if the mobile terminal determines the data rate of the played program does not match the detected network signal intensity, and the data rate of the played program is higher than the data rate matching the network signal intensity, requesting by the mobile terminal the mobile TV service platform to reduce the data rate of the transmitted mobile TV program data;
   sending by the mobile TV service platform, according to the request of the mobile terminal, the mobile TV program data with reduced data rate to the mobile terminal.

3. The method according to claim 2, wherein
   if the mobile terminal determines the data rate of the played program does not match the detected network signal intensity, and the data rate of the played program is lower than the data rate matching the network signal intensity, requesting by the mobile terminal the mobile TV service platform to increase the data rate of the transmitted mobile TV program data;
   sending by the mobile TV service platform, according to the request of the mobile terminal, the mobile TV program data with increased data rate to the mobile terminal.

4. The method according to claim 3, before the mobile TV service platform sends the mobile TV program data with the adjusted data rate to the mobile terminal, further comprising:
   informing the mobile terminal of the adjusted data rate by the mobile TV service platform;
   determining by the mobile terminal whether or not a resource supports the adjusted data rate, and returning a data rate adjustment confirmation message to the mobile TV service platform if the resource supports the adjusted data rate;
   after the data rate adjustment confirmation message is received by the mobile TV service platform, sending the mobile terminal the mobile TV program data with the adjusted data rate by the mobile TV service platform.

5. The method according to claim 4, wherein when the data rate adjustment confirmation message is sent by the mobile terminal, adjusting by the mobile terminal resource occupied by the played mobile TV program according to the adjusted data rate: increasing the resource occupied by the played mobile TV program if the data rate is increased, or maintaining the resource occupied by the played mobile TV program if the data rate is reduced.

6. The method according to claim 2, wherein said that determining whether or not the data rate of the played program matches the detected network signal intensity, comprising:
   dividing the network signal intensity into several grades;
   setting the matching data rate range for each grade; and
   determining the data rate of the played program whether or not be in the data rate range matching the detected network signal intensity.

7. A system for improving playing quality of a mobile TV, comprising: a mobile terminal and a mobile TV service platform, wherein the mobile terminal comprises a program playing module, a network signal intensity detection module and a program data rate adjustment module, wherein
   the program playing module is used for receiving and playing mobile TV program data, detecting a data rate of the played program when playing the mobile TV program, and sending the detected data rate of the played program to the network signal intensity detection module;

the network signal intensity detection module is used for detecting network signal intensity of a mobile TV network, determining a match degree between the received data rate of the played program and the detected network signal intensity, and sending the match degree to the program data rate adjustment module;

the program data rate adjustment module is used for determining whether or not data rate adjustment is needed according to the match degree after receiving the match degree, and requesting the mobile TV service platform to transmit mobile TV program data whose data rate matches the network signal intensity if the data rate adjustment is needed;

the mobile TV service platform is used for sending, according to the request of the program data rate adjustment module, the mobile TV program data with an adjusted data rate to the program playing module.

8. The method according to claim 7, wherein if the program data rate adjustment module determines the data rate adjustment is needed, and the data rate of the played program is higher than the data rate matching the network signal intensity, the program data rate adjustment module requests the mobile TV service platform to reduce the data rate of the transmitted mobile TV program data;

the mobile TV service platform sends, according to the request of the program data rate adjustment module, the mobile TV program data with reduced data rate to the program playing module.

9. The system according to claim 8, wherein if the program data rate adjustment module determines the data rate adjustment is needed, and the data rate of the played program is lower than the data rate matching the network signal intensity, the program data rate adjustment module requests the mobile TV service platform to increase the data rate of the transmitted mobile TV program data;

the mobile TV service platform sends, according to the request of the program data rate adjustment module, the mobile TV program data with increased data rate to the program playing module.

10. The system according to claim 9, further comprising: a program playing resource adjustment module;

the mobile TV service platform is further used for informing the program playing resource adjustment module of the adjusted data rate before sending the mobile TV program data with the adjusted data rate to the program playing module, and sending the mobile TV program data with the adjusted data rate to the program playing module after receiving a data rate adjustment confirmation message;

the program playing resource adjustment module is used for determining, after receiving the adjusted data rate from the mobile TV service platform, whether or not a resource supports the adjusted data rate, and returning the data rate adjustment confirmation message to the mobile TV service platform if the resource supports the adjusted data rate.

11. The system according to claim 10, wherein the program playing resource adjustment module is further used for, when sending the data rate adjustment confirmation message, adjusting resource occupied by the played mobile TV program according to the adjusted data rate: increasing the resource occupied by the played mobile TV program if the data rate is increased, or maintaining the resource occupied by the played mobile TV program if the data rate is reduced.

12. The system according to claim 7, wherein the network signal intensity detection module is further used for dividing the network signal intensity into several grades; setting the matching data rate range for each grade; and determining the data rate of the played program whether or not be in the data rate range matching the detected network signal intensity.

* * * * *